United States Patent [19]

Frye

[11] Patent Number: 4,488,708

[45] Date of Patent: Dec. 18, 1984

[54] DRAW WORKS

[76] Inventor: James A. Frye, 1720 Drakestone, Oklahoma City, Okla. 73120

[21] Appl. No.: 413,709

[22] Filed: Sep. 1, 1982

[51] Int. Cl.³ .............................................. B66D 1/14
[52] U.S. Cl. ................................... 254/355; 254/358; 254/901
[58] Field of Search .............. 254/293, 294, 295, 339, 254/340, 355, 358, DIG. 901

[56] References Cited

U.S. PATENT DOCUMENTS

| | | | |
|---|---|---|---|
| 2,356,371 | 8/1944 | Anderson | 254/358 |
| 2,435,353 | 2/1948 | Hite | 254/339 |
| 2,565,791 | 8/1951 | Wagner et al. | 254/358 |
| 3,539,046 | 11/1970 | Berg | 254/355 |
| 3,738,614 | 6/1973 | Peterson | 254/358 |

*Primary Examiner*—Billy S. Taylor

*Attorney, Agent, or Firm*—E. Harrison Gilbert, III

[57] ABSTRACT

A draw works comprises a drum shaft which is supported off a base at spaced locations by four bearings. Each of the locations is adjacent a support side plate connected to support members of the base. The support members extend transversely to the drum shaft. Two of the support side plates are located on one side of a drum associated with the drum shaft, and two other support side plates are associated with the drum shaft on the other side of the drum. Disposed between the first two support side plates on one side of the drum is a mechanism for receiving a first power input, and disposed between the second two support side plates is another mechanism for receiving a second power input. Transmission mechanisms for coupling the power inputs to the drum shaft are also disclosed.

4 Claims, 3 Drawing Figures

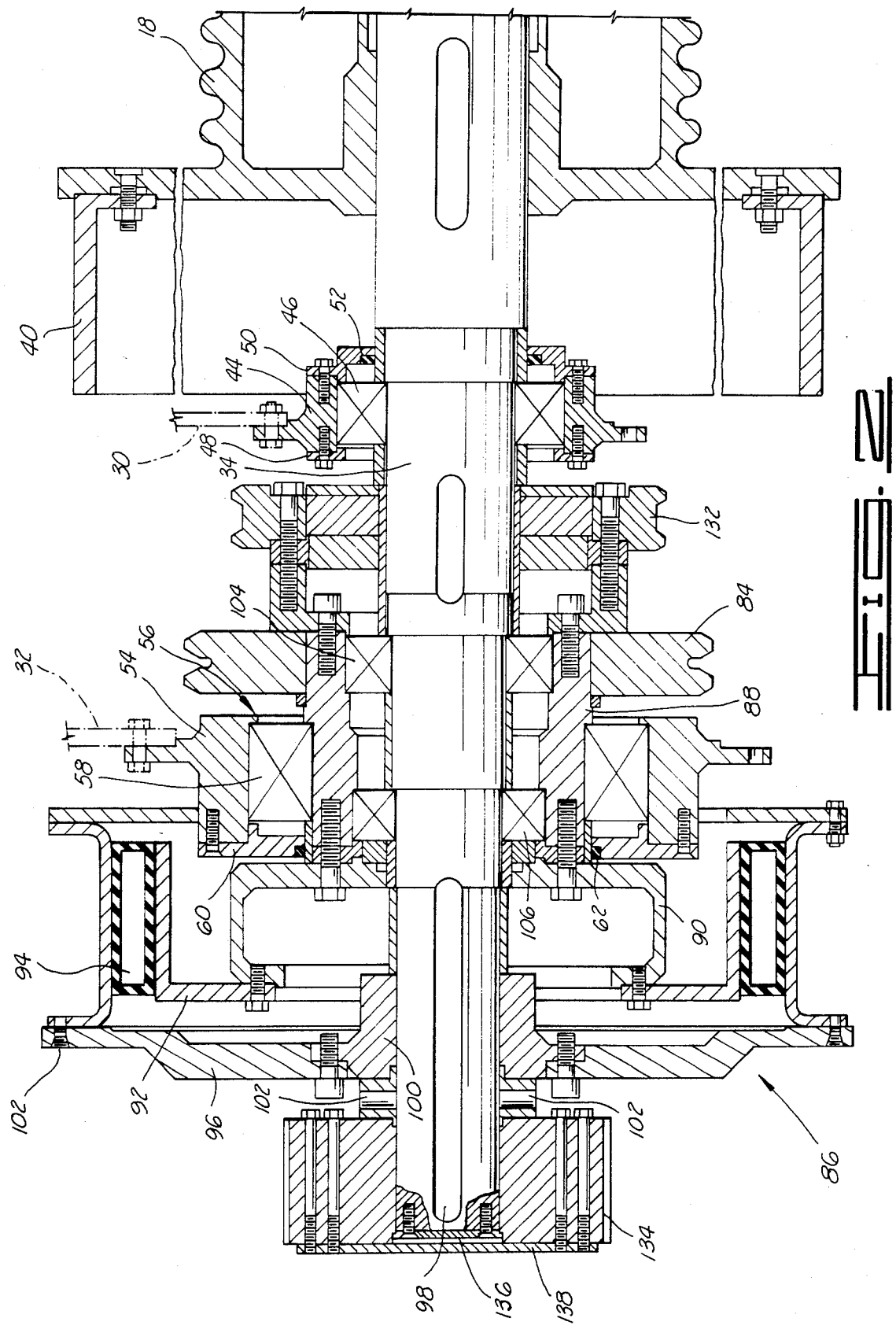

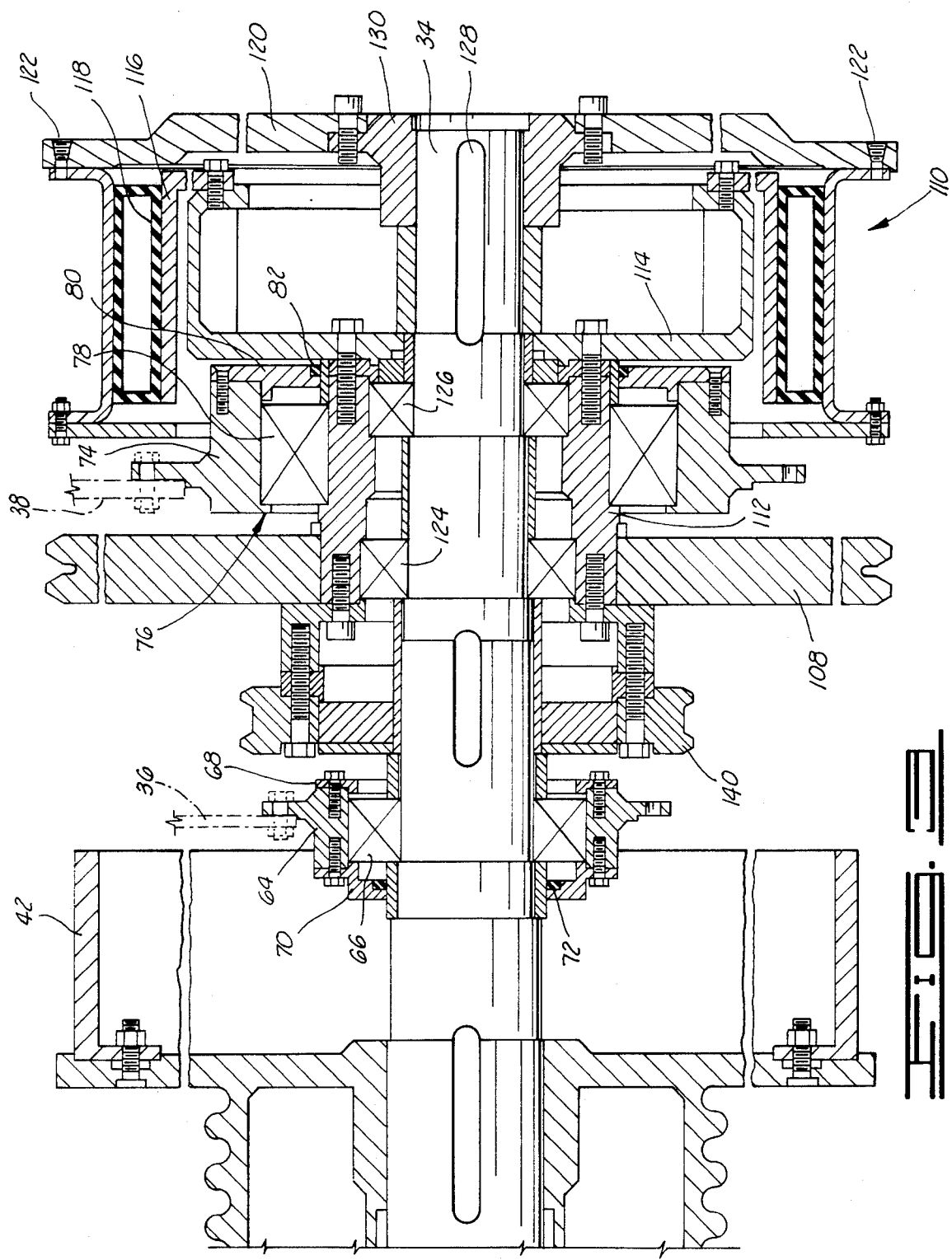

DRAW WORKS

BACKGROUND OF THE INVENTION

This invention relates generally to draw works and more particularly, but not by way of limitation, to a draw works having a drum shaft supported at four points in association with side plates connected to support members extending transversely to the shaft.

In drilling an oil or gas well, a draw works is needed for providing power to the rotary table and for lowering and lifting pipe strings into and out of the hole. The standard design for a draw works used in this manner has not substantially changed over the years. The standard design includes a shaft which is simply supported by a single bearing on either side of a drum mounted on the shaft. This type of standard design creates cantilevered portions of the shaft extending beyond each of the bearings. To each of these cantilevered portions of the shaft are mounted sprockets for coupling with a variable speed transmission and sprockets for coupling with and providing power to the rotary table and the cat shaft which is used in making and breaking connections between sections of a pipe string as it is lowered into or lifted out of the well hole. An example of this type of draw works is the National 80-B consolidated rig marketed by the National Supply Company.

A shortcoming of this construction is that each end of the shaft is in effect a simply supported beam. Being simply supported permits the shaft to be deflected a relatively large amount by the action of the drum mounted on the shaft and the weight of the cable wound on the drum. The greater the deflection of the shaft, the shorter is the useful life of the shaft. Additionally, this simply supported structure has a relatively limited area across which forces arising from the action of the transmission on the shaft-mounted sprockets and from the resistance applied by the rotary table and the cat shaft can act to produce excessive stress.

Therefore, there is the need for a new draw works which is constructed so that the magnitude of deflection of the shaft is reduced to thereby increase the life of the shaft. Additionally, there is the need for a new construction which reduces the stress in any one support member supporting the shaft.

Although there are these two needs, such a new construction should not limit the accessibility of clutches which are part of the draw works because the clutches are the elements which most often need to be replaced or repaired. The new construction also should be such that it does not significantly increase the manufacturing cost of the draw works whereby the new draw works is competitive with the prior type of draw works.

Still further, such a new construction should meet the reduced deflection and stress needs by utilizing support structures which will increase the tensile resistance to pull and which will provide a stronger draw works.

To facilitate the maintenance of the new draw works, it should also be designed to utilize standard bearings.

SUMMARY OF THE INVENTION

The present invention overcomes the above-noted and other shortcomings of the prior art by providing a novel and improved draw works. This draw works is supported at four points so that the magnitude of deflection of a drum shaft of the draw works is reduced relative to the amount of deflection which can occur in the prior types of draw works. This four point support construction reduces the stress applied to individual support elements resulting from the force between a draw works transmission and the drum shaft and from the drag produced by the rotary table and the cat shaft.

This construction is achieved by using load bearing members which are welded lengthwise along the tops of beams of a base thereby increasing the tensile resistance of the draw works to pull and thereby creating a stronger draw works.

To facilitate the maintenance of the draw works, this new construction retains access to the clutches and utilizes standard bearings.

Furthermore, the new draw works is competitive in manufacturing cost with that of the prior type of draw works.

Broadly, the draw works of the present invention comprises a base, a drum shaft, a drum associated with the drum shaft, first support means for supporting the drum shaft off of the base at first and second spaced locations along a first section of the drum shaft extending from a first end of the drum, and second support means for supporting the drum shaft off of the base at third and fourth locations along a second section of the drum shaft extending from a second end of the drum. The draw works further comprises first power input means, disposed between the first and second spaced locations, for receiving a first power input, and second power input means, disposed between the third and fourth spaced locations, for receiving a second power input.

The base includes a plurality of support members extending transversely to the drum shaft and having the first and second support means connected thereto along joints also extending transversely to the drum shaft.

The first support means includes a first side plate having a first bearing housing connected thereto, and the first support means also includes a second side plate spaced from the first side plate and having a second bearing housing connected thereto. The first support means also includes a first bearing retained on the drum shaft in rotative and drum-shaft-supportive relationship with the first bearing housing, and it further includes a second bearing associated with the drum shaft in rotative and drum-shaft-supportive relationship with the second bearing housing. The second support means includes similar elements.

Therefore, from the foregoing, it is a general object of the present invention to provide a novel and improved draw works. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 2 is a schematic sectional elevational view of the off-driller's side of a shaft assembly of the draw works.

FIG. 3 is a schematic sectional elevational view of the driller's side of the shaft assembly of the draw works.

DETAILED DESCRIPTION OF THE PREFERRED EMBODIMENT

Figure 1:
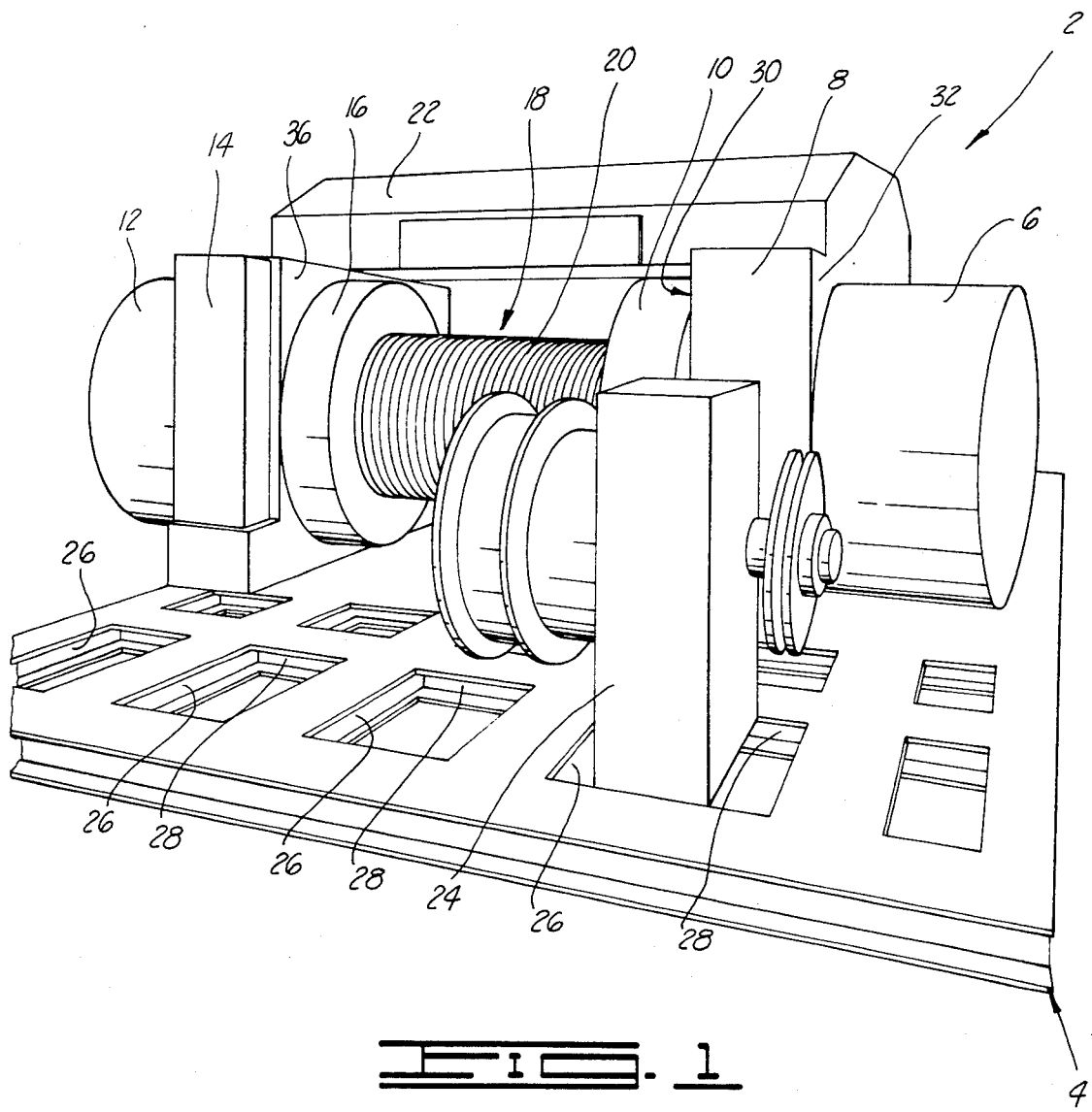
FIG. 1 is a schematic perspective view of a draw works constructed in accordance with the present invention.

With reference to the drawings the preferred embodiment of a draw works 2 constructed in accordance with the present invention will be described. In FIG. 1 the draw works 2 is broadly shown to include a base 4 having the remainder of the draw works mounted thereon. FIG. 1 also shows the draw works 2 includes several housings through which a shaft assembly extends. The housings include an off-driller's side spline hub and clutch housing 6, an off-driller's side chain housing 8, and an off-driller's side brake flange housing 10. The housings further include a driller's side clutch housing 12, a driller's side chain housing 14, and a driller's side brake flange housing 16. Extending through these housings is the shaft assembly upon which a drum 18 is mounted. In the FIG. 1 illustration, the drum 18 is shown with a cable 20 wound thereon.

An additional housing, indicated by the reference numeral 22, has a cat shaft (not shown) contained therein as known to the art. A cat shaft is used for making up and breaking out segments of pipe from a pipe string as known to the art. Power is imparted to the cat shaft by suitable coupling means, such as a chain drive member, extending from the driller's side chain housing 14.

Further shown in FIG. 1 to be mounted on the base 4 is a rotary table drive means 24 as known to the art. The rotary table drive means 24 provides rotary power to the rotary table as known to the art. The driving force is coupled from the shaft assembly to the rotary table drive means 24 by means of suitable coupling means as known to the art. In the preferred embodiment this coupling means is a drive chain (not shown) extending from the off-driller's chain housing 8 to the rotary table drive means 24.

The following description of the preferred embodiment of the present invention will be limited to a more detailed analysis of the base 4 and the shaft assembly retained within the various housings and the associated support structures of the housings. The remaining structures illustrated in FIG. 1 will not be further discussed because they are of ordinary construction as known to the art.

The base 4 comprises a plurality of support members 26 extending transversely to the shaft assembly. The chain housings 8 and 14 are connected to the support members 26 as will be more particularly described hereinbelow. The support members 26 are made of suitable structural materials as known to the art. For example, the support members 26 can be beams of different sizes and/or shapes, such as rectangular tubing. In the preferred embodiment the support members 26 include four 14 inch × 10 inch WF beams which are sixteen feet long. Many lateral structural members 28 are also shown in FIG. 1 connecting adjacent ones of the support members 26. The base 4 supports the housings mounted thereon.

The housing 8 includes a first side plate 30 and a second side plate 32 which form a part of a first support means for supporting a drum shaft 34 of the shaft assembly off of the base 4 at first and second spaced locations along a first section of the drum shaft 34. The first section extends from a first end of the drum 18 rotatably associated with the drum shaft 34 for rotation therewith. The first side plate 30 is an inboard member which is similar to the shaft supporting side wall in prior types of draw works. In the preferred embodiment the side plate is constructed of steel and has a thickness of approximately one inch. The second side plate 32 is an outboard member which replaces a similarly located side wall member in the prior types of draw works. The side plate 32 of the present invention, however, is distinguishable from the similarly located side wall members of the prior types in that the side plate 32 has a greater thickness and provides support for the drum shaft 34, whereas in the prior types of draw works the similarly located member merely provides a seal or covering without supporting the drum shaft. In the preferred embodiment the thickness of the second side plate 32 is also approximately one inch.

The first and second side plates 30 and 32 are spaced from each other a suitable distance as illustrated in FIG. 2. In the preferred embodiment each of these side plates is welded to appropriate ones of the support members 26 of the base 4 extending transversely to the shaft assembly. These welds are along linear joints also extending transversely to the shaft assembly.

Similar supporting side plates are found in the chain housing 14. The housing 14 includes a third side plate 36 and a fourth side plate 38. The side plate 36 corresponds to the side plate 30 on the off-driller side of the shaft assembly, and the side plate 38 corresponds to the side plate 32 on the off-driller's side of the shaft assembly. Side plates 36 and 38 are constructed and utilized in a similar fashion to the corresponding side plates 30 and 32. The side plates 36 and 38 provide the supports for the driller's side of the shaft assembly. As with the side plates 30 and 32, the side plates 36 and 38 are spaced from each other and are welded along respective ones of the support members of the base 4 along linear joints extending transversely to the shaft assembly. The third and fourth side plates are part of a second support means for supporting the drum shaft 34 off of the base 4 at third and fourth locations along a second section of the drum shaft 34 extending from a second end of the drum 18.

By welding the side plates 30, 32, 36 and 38 lengthwise along the tops of appropriate ones of the support members, 26, the draw works' tensile resistance to pull is increased and the effective weld area between the side plates and the support members 26 is also increased. For example, assuming that the prior type of draw works had only two, one-inch thick plates (corresponding to plates 30, 36) welded at right angles across the tops of three 14 inch × 10 inch WF beams, the effective weld length would be:

2 side plates × 2 fillets/side plate × 3 WF beams × 10 inchs of weld/beam = 120 inches.

However, for the preferred embodiment of the present invention, the four one-inch thick plates 30, 32, 36 and 38 are welded along twelve feet of the tops of four 14 inch × 10 inch WF beams, thereby yielding an effective weld length of:

4 side plates × 2 fillets/side plate × 4 WF beams 144 inches of weld/beam = 4608 inches.

Therefore, the present invention provides an effective weld length of approximately thirty-eight times the length provided by the prior art design.

The side plates 30, 32, 36 and 38 support the shaft assembly off of the base 4 by being mechanically connected to respective points of the shaft assembly as illustrated in FIGS. 2 and 3. It is to be noted that FIG. 2 discloses the off-driller's side of the shaft assembly and FIG. 3 discloses the driller's side of the shaft assembly. The overall shaft assembly (less a portion passing through the drum 18) can be visualized by viewing FIGS. 2 and 3 next to each other with FIG. 2 on the left and FIG. 3 on the right as viewing the figures.

As previously mentioned, the shaft assembly includes the drum shaft 34 with which the drum 18 is associated. Connected to a first end of the drum 18 as shown in FIG. 2 is a first brake flange 40 which is housed in the off-driller's side brake flange housing 10 as shown in FIG. 1. Connected to a second end of the drum 18 is a second brake flange 42 which is housed in the driller's side brake flange housing 16 shown in FIG. 1. The drum shaft 34, the drum 18 and the brake flanges 40 and 42 are of common construction as known to the art.

With reference to FIG. 2, the remainder of the aforementioned first support means will be described. The first support means further comprises a first bearing means including a first bearing housing 44 which is connected by suitable means, such as a nut and bolt, to the first side plate 30. Housed within the first bearing housing 44 is a first bearing 46 which is retained on the drum shaft 34 for rotating therewith within the housing 44. A bearing retainer member 48 and a seal plate 50 are suitably connected to the bearing housing 44 as shown in FIG. 2. The seal plate 50 houses a suitable oil seal member 52. The first bearing 46 is retained on the drum shaft 34 in rotative and drum-shaft-supporting relationship with the first bearing housing 44. The bearing 46 can be said to support the drum shaft 34 adjacent the first side plate 30. This structure is similar to a comparable structure in prior types of draw works.

The first support means further comprises a second bearing means for supporting the drum shaft 34 adjacent the second side plate 32. The second bearing means comprises a second bearing housing 54 connected by suitable means to the second side plate 32 as illustrated in FIG. 2. The second bearing housing 54 is flanged so that it has a flange portion 56 having an interior surface disposed adjacent a second bearing 58 housed within the housing 54. Connected to the bearing housing 54 opposite the flange portion 56 is a seal plate 60 having associated therewith a suitable oil seal member 62. The bearing housing 54 is rigidly connected to the side plate 32 so that it remains stationary, whereas the bearing 58 engages the housing 54 but moves relative thereto when the drum shaft 34 rotates. The second bearing 58 is associated with the drum shaft 34 in rotative and drum-shaft-supportive relationship with the second bearing housing 54.

With reference to FIG. 3, the remainder of the aforementioned second support means will be described. It is to be noted that the remaining elements of the second support means include third and fourth bearing means which are similar to the corresponding ones of the first support means as will be evident upon examining FIG. 3 and which are similarly associated with the drum shaft 34 in rotative and drum-shaft-supportive relationship.

The third bearing means includes a third bearing housing 64 having a bearing 66 housed therein. Connected to the third bearing housing 64 are a bearing retainer member 68 and a seal plate 70 having an oil seal member 72 associated therewith.

The fourth bearing means includes a fourth bearing housing 74 which is flanged to have a flange portion 76 with which a fourth bearing 78 engages. Connected to the fourth bearing housing 74 is a fourth seal plate 80 having an oil seal member 82 associated therewith.

The shaft assembly further comprises first power input means, disposed between the first and second side plates 30 and 32, for receiving a first power input to rotate the drum shaft 34. This first power input is provided by a main transmission used with the draw works but not shown in the drawings. This transmission is of a type known in the art. For the embodiment shown in FIG. 2, the first power input means includes a sprocket wheel 84 which is connected by a chain (not shown) in the preferred embodiment to the high speed portion of the transmission as known to the art.

FIG. 2 further discloses that the off-driller's side of the shaft assembly includes a first power transmission means comprising a first clutch assembly 86 and a first drive adapter member 88 for connecting the first power input means (i.e., the sprocket wheel 84 for the embodiment shown in the figures) to the first clutch assembly 86. The first drive adapter member 88 can also be referred to as a coupling for coupling the bearing 58 with the drum shaft 34 whereby the bearing 58 rotates with the drum shaft 34 when the drive adapter member 88 rotates with the drum shaft 34. Regardless of the relative movement of the drum shaft 34 and the bearing 58, the bearing provides support to the drum shaft by means of the coupling via the drive adapter member 88 and the engagement with the bearing housing 54.

The clutch assembly 86 includes a high speed clutch drum adapter member 90, a clutch drum 92, an inflatable clutch element 94, and a clutch drive member 96 as known to the art. The clutch drive member 96 engages one or more key elements 98 disposed on the drum shaft 34. This engagement in the preferred embodiment is made via an adapter member 100 and causes the drum shaft 34 to rotate when the sprocket wheel 84 is driven by the main transmission and when the clutch element 94 is inflated. The inflatable clutch element 94 is inflatable with air provided through air adapters 102 and interconnecting hoses (not shown) as known to the art.

The drive adapter member 88 is of a type as known to the art. The drive adapter member 88 is spaced from the drum shaft 34 and houses two bearings 104 and 106 which permit the sprocket wheel 84, the drive adapter member 88, the bearing 58, the high speed clutch drum adapter member 90, and the clutch drum 92 to freewheel or rotate relative to the drum shaft 34 as known to the art. No free-wheeling occurs when the clutch element 94 is suitably inflated and the sprocket wheel 84 is being driven by the main transmission or the shaft 34 is otherwise being rotated.

A similar structure is disclosed to be included on the driller's side of the shaft assembly as illustrated in FIG. 3. The similar elements comprise a second power input means, disposed between the third and fourth side plates 36 and 38, for receiving a second power input to rotate the drum shaft 34. The second power input is likewise provided by the main transmission; however, this power input is a low speed input as known to the art. In the preferred embodiment the second power input means includes a sprocket wheel 108.

The driller's side also includes a second power transmission means including a second clutch assembly 110 connected to the sprocket wheel 108 by a second drive adapter member 112. The drive adapter member 112 has the bearing 78 retained thereon. As with the first clutch assembly 86, the second clutch assembly 110 includes a clutch drum adapter member, a clutch drum, an inflatable clutch element, and a clutch drive plate identified in FIG. 3 by the reference numerals 114, 116, 118 and 120, respectively. The inflatable clutch element 118 is inflatable by means of air provided through air adapters 122 as known to the art.

The second drive adapter member 112 is a second coupling means for coupling the bearing 78 with the drum shaft 34 whereby the bearing 78 rotates with the drum shaft 34 when the drive adapter member 112 rotates with the drum shaft 34. Through this coupling and the engagement between the bearing 78 and the bearing housing 74, the bearing 78 supports the drum shaft 34. The drive adapter member 112 houses bearings 124 and 126 which are disposed adjacent the drum shaft 34 to enable the sprocket wheel 108, the drive adapter member 112, the bearing 78, the clutch drum adapter member 114, and the clutch drum 116 to rotate relative to the drum shaft 34 as known to the art. When the clutch element 118 is inflated and transmission power is being provided to the sprocket wheel 108 or when elements of the off-driller's side are rotating the drum shaft 34, then these elements of the driller's side rotate with the drum shaft 34 by means of engagement of one or more keys 128 with an adapter 130 to which the clutch drive plate 120 is connected.

Referring again to FIG. 2, the off-driller's side is also shown to include a sprocket wheel 132 which can be appropriately coupled as known to the art to the rotary table drive means 24 shown in FIG. 1. This transfers power from the draw works 2 to the rotary table as known to the art.

The off-driller's side of the shaft assembly also includes a splined hub 134 for engaging with a Hydromatic brake as known to the art. The splined hub 134 is retained on the drum shaft 34 by means of a suitable splined hub retainer member 136.

Also associated with the splined hub 134 is a retainer member 138 for receiving the air connection which is to supply air to the clutch elements via the air adapters 102 and 122.

With reference again to FIG. 3, it will be seen that the driller's side of the shaft assembly further comprises a sprocket wheel 140 for transferring power from the draw works 2 to the cat shaft retained within the housing 22 as known to the art.

It is to be noted that it is the second and fourth bearing means described hereinabove and their connections with the second and fourth side plates 32 and 38, respectively, which provide the draw works 2 with the additional support established by the present invention. By utilizing these additional two bearing means, the stress due to chain pull between the draw works transmission and the drum shaft 34 is reduced as indicated by the following example:

Assume that the chain pull force to be applied by the driving transmission coupled through one of the sprocket wheels is 56,575 pounds derived by assuming 1000 horsepower and a speed of 50 revolutions per minute yielding a torque of 1,260,500 inch-pounds (63025×hp/rpm) and a sprocket radius of 22.28 inches. Applying such a chain pull to a nine-inch cantilevered portion of the drum shaft through the simply supported sprocket wheel of a prior art draw works yields a stress of 24,054 pounds per square inch derived as follows:

$M_{max} = $ length of cantilevered overhang $\times$ chain pull $M_{max} = 9$ inches $\times 56,575$ pounds $= 509,175$ in.-lbs.

Stress (bending) $= S = M_{max}/Z$ (where Z for a six-inch shaft $= 21.168$ in.$^3$) $= 509,175/21.168 = 24,054$ On the other hand, for the design of the present invention, the stress is only 9,020 pounds per square inch, or a little more than one-third the stress of the prior design. The stress for the present invention is calculated as follows:

$M_{max} = 3 \times$ chain pull $\times$ distance between bearings/16

Assuming the distance between the bearings is 18 inches, $M_{max} = 3 \times 56,575 \times 18/16 = 190,941$ in.-lbs.

$S = 190,941/21.168 = 9020$ lbs./in.$^2$

By providing two bearings approximately eighteen inches apart on each end of the drum shaft 34, the shaft is converted from a simply supported beam to a fixed beam. This difference in support decreases the magnitude of the deflection of the shaft of the new draw works relative to the old draw works under the same loading in accordance with the following example:

The wire rope pull against the drum will be designated P and equals torque/(drum radius $+1.5 \times$ wire rope diameter). For a torque of 1,260,500 in-lbs., a drum radius of 12.5 inches, and a wire rope diameter of 1.5 inches, P = 85,458 lbs.

For the simply supported draw works of the prior art, this pull causes a maximum deflection of 0.105 inch derived as follows and assuming a concentrated load at midspan:

Assume:
L = 75 inches for drum
Z = 60.18 in.$^3$
E = 28,000,000 for carbon steel
d = 8.5 inches $M_{max} = PL/4 = (85,458)(75)/4 = 1,602,338$ in.-lbs.

maximum deflection $= PL^3/48EI$, where $I = \pi d^4/64$
256.24 in.$^4$ maximum deflection $= (85,458)(75)^3/(48)(28,000,000)(256.24) = 0.105$ in.

For the present invention, the same pulling force causes a maximum deflection of only 0.0263 inch derived as follows and again assuming a concentrated load at midspan:

$M_{max} = PL/8 = 801,169$ in.-lbs.

maximum deflection $= PL^3/192EI = 0.0263$ in.

Because the magnitude of deflection of a rotating shaft directly affects the fatigue life of the shaft, the foregoing calculations of maximum deflection indicate the same drum shaft will last four times longer if used in the present invention rather than in the prior art type of draw works.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. A draw works, comprising:
   a base;
   a drum shaft;
   a drum associated with said drum shaft;
   first support means for supporting said drum shaft off of said base at first and second spaced locations along a first section of said drum shaft extending from a first end of said drum, said first support means including:
   a first side plate supported by said base;
   a second side plate, spaced from said first side plate, supported by said base;
   a first bearing housing connected to said first side plate;
   a second bearing housing connected to said second side plate;
   a first bearing retained on said drum shaft in rotative and drum-shaft-supportive relationship with said first bearing housing; and
   a second bearing associated with said drum shaft in rotative and drum-shaft-supportive relationship with said second bearing housing;
   second support means for supporting said drum shaft off of said base at third and fourth locations along a second section of said drum shaft extending from a second end of said drum, said second support means including:
   a third side plate supported by said base;
   a fourth side plate, spaced from said third side plate, supported by said base;
   a third bearing housing connected to said third side plate;
   a fourth bearing housing connected to said fourth side plate;
   a third bearing retained on said drum shaft in rotative and drum-shaft-supportive relationship with said third bearing housing; and
   a fourth bearing associated with said drum shaft in rotative and drum-shaft-supportive relationship with said fourth bearing housing;
   said base including a plurality of support members extending transversely to said drum shaft and having said first, second, third and fourth side plates connected thereto;
   first power input means, disposed between said first and second side plates, for receiving a first power input to rotate said drum shaft; and
   second power input means, disposed between said third and fourth side plates, for receiving a second power input to rotate said drum shaft.

2. An apparatus as defined in claim 1, further comprising:
   first power transmission means, including:
   a first clutch assembly; and
   first drive adapter means for connecting said first power input means to said first clutch assembly, said first drive adapter means having said second bearing retained thereon; and
   second power transmission means, including:
   a second clutch assembly; and
   a second drive adapter means for connecting said second power input means to said second clutch assembly, said second drive adapter means having said fourth bearing retained thereon.

3. A draw works, comprising:
   a base;
   a drum shaft;
   a drum associated with said drum shaft;
   first support means for supporting said drum shaft off of said base at first and second spaced locations along a first section of said drum shaft extending from a first end of said drum;
   second support means for supporting said drum shaft off of said base at third and fourth locations along a second section of said drum shaft extending from a second end of said drum;
   said base including a plurality of support members extending transversely to said drum shaft and having said first and second support means connected thereto along joints also extending transversely to said drum shaft;
   first power input means, disposed between said first and second spaced locations, for receiving a first power input; and
   second power input means, disposed between said third and fourth spaced locations, for receiving a second power input.

4. A draw works, comprising:
   a base;
   a drum shaft;
   a drum associated with said drum shaft;
   first support means for supporting said drum shaft off of said base at first and second spaced locations along a first section of said drum shaft extending from a first end of said drum;
   second support means for supporting said drum shaft off of said base at third and fourth locations along a second section of said drum shaft extending from a second end of said drum;
   first power input means, disposed between said first and second spaced locations, for receiving a first power input; and
   second power input means, disposed between said third and fourth spaced locations, for receiving a second power input.

* * * * *